Patented Apr. 3, 1945

2,373,021

UNITED STATES PATENT OFFICE

2,373,021

STABILIZATION OF PETROLEUM HYDROCARBONS

Frederick B. Downing and Charles J. Pedersen, Penns Grove, N. J., assignors to E. I. du Pont de Nemours & Company, Wilmington, Del., a corporation of Delaware No Drawing. Application February 5, 1943, Serial No. 474,846

20 Claims. (Cl. 44—74)

This invention relates to the stabilization of petroleum hydrocarbons and particularly to the stabilization of such hydrocarbons which are subject to deterioration caused by the action of molecular oxygen and catalyzed by metals and their compounds.

Petroleum hydrocarbons are readily attacked by oxygen and the resulting deterioration imparts undesirable qualities to them and eventually destroys their usefulness. Signal success has been achieved in recent years, in the preservation of petroleum hydrocarbons, by the discovery and use of compounds generically called "oxidation inhibitors" or "antioxidants." These agents, mostly oxidizable organic compounds, retard the autocatalytic process. Since antioxidants are themselves oxidized in the course of time, as a result of auto-oxidation, the beneficial effect, obtained by their use, is not permanent and they protect the petroleum hydrocarbons only so long as they are not rendered inactive. They are, moreover, very specific in action, each group of auto-oxidizable substances requiring a different type of antioxidant for the best results.

Vanadium, manganese, iron, cobalt, copper and their catalytically active compounds accelerate the rate of oxidation of petroleum hydrocarbons. For example, it is well known that copper compounds speed the formation of gum in cracked gasoline and that iron compounds catalyze the deterioration of lubricating oils. They also accelerate the oxidation of aromatic hydroxy and amino antioxidants, used to stabilize these oxidizable substances. Hence, these metal catalysts and the antioxidants are antagonistic in action, and the normal inhibiting effect of the latter is greatly reduced in the presence of the former.

Metal compounds occur naturally in many petroleum hydrocarbons, but often in such slight traces as to cause very little harm. Their concentrations, however, are frequently raised during the course of handling and utilizing the products; vessels and conduits made of metals containing copper or iron are used for storage and transportation, or ingredients contaminated with metal compounds might be added.

The harm done by these extraneous catalysts may be prevented by at least three methods: (1) their removal by purification, but often this is practically impossible of accomplishment and usually too costly to be economically feasible, (2) the addition of a sufficient amount of an antioxidant so that its preserving effect is equal to or greater than the pro-oxidant effects of the metal catalysts present, but the effectiveness of the antioxidant is so greatly diminished by the metal catalysts that the advantage gained under this circumstance is seldom worth the cost of the increased quantity of antioxidant required for adequate stabilization, and (3) the suppression of the catalytic activity of the metal compounds by chemical means without physically removing them from the system.

It is an object of the present invention to retard the deterioration of petroleum hydrocarbons caused by the action of molecular oxygen and promoted by the presence of certain metal catalysts and their catalytically active compounds. Another object is to render antioxidants, which are relatively ineffective in the presence of metal catalysts and their catalytically active compounds, effective to inhibit the oxidation of oxidizable petroleum hydrocarbons even in the presence of metal catalysts and their catalytically active compounds. A further object is to provide a new class of metal deactivators which are effective to render metal catalysts inactive to catalyze the oxidation of oxidizable petroleum hydrocarbons containing or in contact with such metal catalysts. A more particular object is to inhibit the deterioration of non-viscous hydrocarbon oils in the presence of metal catalysts and their catalytically active compounds. Other objects are to provide new compositions of matter and to advance the art. Still other objects will appear hereinafter.

The above and other objects may be accomplished in accordance with our invention which comprises adding to petroleum hydrocarbons, normally subject to deterioration caused by the action of molecular oxygen and containing a catalyst of the group of vanadium, manganese, iron, cobalt, copper and their compounds, normally effective to catalyze oxidation of said petroleum hydrocarbons, a metal deactivator in a small proportion sufficient to deactivate said catalyst, said metal deactivators being guanylguanidines, having the formula

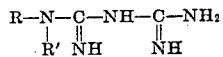

wherein R represents hydrogen or a cyclic organic radical and R' represents hydrogen or an alkyl radical, and salts of such guanylguanidines. The petroleum hydrocarbons generally will contain in addition an antioxidant which is normally effective to retard oxidation of the hydrocarbons in the absence of the metal catalyst. We have found that such metal deactivators are capable of effectively suppressing the catalytic activity of vanadium, manganese, iron, cobalt, copper and their catalytically active compounds and hence will render such catalysts ineffective to catalyze the oxidation of petroleum hydrocarbons, including any antioxidants which may be present.

The petroleum hydrocarbons, which may be treated in accordance with our invention, include straight-run gasoline, cracked gasoline, kerosene, Diesel fuel oils, domestic heating fuel oils and lubricating oils. Our metal deactivators are particularly adapted for use in non-viscous hydrocarbon oils of the class of gasoline, kerosene, Diesel oils and domestic fuel oils which have a Saybolt Universal viscosity of not exceeding 45 seconds at 100° F., and especially in gum-forming hydrocarbon distillates, such as, for example, cracked gasoline. Generally, in practice, the petroleum hydrocarbons will also contain an antioxidant which is normally effective to materially retard the deterioration or oxidation of the hydrocarbons in the absence of the catalytically active metals, but which is less effective in the presence of such metals.

The metal deactivators of our invention must contain as a nucleus the group

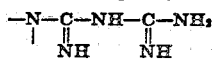

as such group appears to be the active grouping which provides the metal deactivating properties for the compounds. The elements and groups, satisfying the free valences, may be widely varied without destroying the function of the grouping in deactivating the metal catalysts. We may use the free guanylguanidines or their salts of either inorganic or organic acids. Accordingly, when we refer to a "guanylguanidine compound," we intend to include the salts, as well as the free guanylguanidines. It will usually be preferred to use the free guanylguanidines rather than the salts.

We generally prefer to employ the guanylguanidines wherein R in the formula

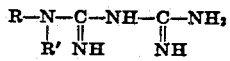

represents a cyclic organic radical and R' represents hydrogen. Also, preferably, the guanylguanidines are devoid of strongly acidic groups, that is, of substituted groups more strongly acidic than phenolic hydroxyl. We further prefer those compounds wherein the radical, represented by R, consists of carbon and hydrogen. We particularly prefer the compounds wherein R is an aromatic radical and especially an aryl radical of the benzene series. By an "aryl radical," we mean an aromatic radical which consists of carbon and hydrogen.

Definite operative concentrations of the metal deactivator in the petroleum hydrocarbons cannot be specified for each case as the quantity required is dependent upon the amount of metal catalyst present in the product. The metal deactivator should be present in the proportion of approximately 5 to 30 times the amount of the metal catalyst present, on the basis of the metallic element, in order to obtain complete deactivation of the metal catalyst. Higher proportions of metal deactivator may be employed, particularly when a reservoir of metal is present in the form of metal in bulk in contact with the petroleum hydrocarbons. Generally, from about 0.0001% to about 1.0% based on the weight of the hydrocarbons, will be sufficient for most purposes, particularly when the organic substance is a non-viscous hydrocarbon oil, such as a gum-forming hydrocarbon distillate of the character of cracked gasoline.

The catalytically active metal and its compounds may be dissolved in the petroleum hydrocarbons or suspended therein or may be in the form of metal in bulk in intimate contact with the hydrocarbons. It will be understood that, when we refer to petroleum hydrocarbons containing a catalyst, we mean to include those cases wherein the metal in bulk form is in contact with the hydrocarbons, as well as those cases wherein the catalytically active metal is dissolved or suspended in the hydrocarbons.

The experimental results, obtained with compounds belonging to this class of deactivators, are given in the following tables.

In order to avoid confusion arising from a superabundance of data, gasoline has been selected as an example of auto-oxidizable petroleum hydrocarbons for the purposes of illustration. The samples of gasoline, used in the following tests, were either cracked gasolines or blends of cracked and straight-run gasolines, completely refined, but otherwise untreated with chemical agents, such as dyes, anti-knocks and antioxidants. Since gasoline is a mixture of variable composition, identical results are not obtained with different samples. The magnitude of the effects is great enough, however, to render this difference relatively insignificant.

p-Benzylaminophenol, abbreviated BAP, has been chosen as a representative gasoline antioxidant. The metals, present as catalysts, were employed as their oleates. The concentrations of antioxidants and the metal deactivators are given in weight percent in gasoline. The concentrations of the metals are given in parts per million by weight of the metal, abbreviated P. P. M., rather than by weight of the metal oleate.

The term "stabilized gasoline" is employed to denote gasoline to which has been added an antioxidant in sufficient quantity to significantly increase its induction period in the absence of added metal catalysts.

The accelerated method, used for determining the induction periods given below, was the one described in J. I. E. C. 25, 397 (1933). It consists in heating 100 cc. of gasoline at 100° C. in a 1 liter Pyrex flask containing pure oxygen. The internal pressure is observed every 10 minutes by means of a manometer attached to the system. The elapsed time, from the start of the test until the gasoline begins to absorb oxygen at the rate of 10 cc. per 10 minutes or higher, as shown by the fall in internal pressure, is taken as the induction period. It has been found that the induction period, obtained by this method, although greatly shortened, is a fairly accurate measure of the relative stability of gasoline under normal storage conditions.

Table I

| No. | Conc. BAP | Conc. Cu | Deactivator | Conc. | Ind. period |
|---|---|---|---|---|---|
| | Wt. per cent | P. P. M. | | Wt. per cent | Minutes |
| 1 | 0.0 | 0.0 | None | | 250 |
| 2 | 0.0005 | 0.0 | do | | 330 |
| 3 | 0.0005 | 1.0 | do | | 30 |
| 4 | 0.0005 | 1.0 | a-Cyclohexyl-guanylguanidine | 0.002 | 380 |
| 5 | 0.0005 | 1.0 | a-Phenyl-guanylguanidine | 0.002 | 340 |

Table II

| No. | Conc. BAP | Conc. Cu | Deactivator | Conc. | Ind. period |
|---|---|---|---|---|---|
| | Wt. per cent | P. P. M. | | Wt. per cent | Minutes |
| 1 | 0.0 | 0.0 | None | | 150 |
| 2 | 0.002 | 0.0 | do | | 260 |
| 3 | 0.002 | 1.0 | do | | 40 |
| 4 | 0.002 | 1.0 | a-(4-Dodecylphenyl)-guanylguanidine | 0.005 | 290 |

Table III

| No. | Conc. BAP | Conc. Cu | Deactivator | Conc. | Ind. period |
|---|---|---|---|---|---|
| | Wt. per cent | P. P. M. | | Wt. per cent | Minutes |
| 1 | 0.0 | 0.0 | None | | 220 |
| 2 | 0.001 | 0.0 | do | | 370 |
| 3 | 0.001 | 1.0 | do | | 30 |
| 4 | 0.001 | 1.0 | a-(1-Naphthyl)-guanylguanidine | 0.002 | 330 |
| 5 | 0.001 | 1.0 | a-Ethyl-a-phenyl-guanylguanidine | 0.002 | 280 |

It will be observed that the catalytic effect of copper is counteracted by these compounds.

Copper is one of the most potent catalysts for the oxidation of petroleum hydrocarbons. It is the most powerful and one of the most common metal contaminants in gasoline. Other metals, however, possess different degrees of catalytic activity.

The action of certain catalysts on stabilized gasoline and the effect of alpha-phenyl-guanylguanidine on their activity are shown in Table IV.

Table IV

[Induction period of control, 130 minutes]

This gasoline, containing 0.0025% p-(n-butylamino)-phenol and having an induction period of 400 minutes in the absence of metal catalysts, was used for the following tests.

| No. | Metal catalyst | Conc. | Induction period in minutes | |
|---|---|---|---|---|
| | | | No deactivator | Plus 0.005% a-phenyl-guanylguanidine |
| | | P. P. M. | | |
| 1 | Vanadium | 0.8 | 140 | 270 |
| 2 | Manganese | 0.86 | 250 | 330 |
| 3 | Iron | 0.87 | 325 | 405 |
| 4 | Cobalt | 0.92 | 230 | 445 |
| 5 | Copper | 1.0 | 75 | 440 |

It will be understood that the experiments and tests, hereinbefore given, have been given for illustrative purposes only. Many variations and modifications can be made in our invention without departing from the spirit or scope thereof. The metal deactivators of our invention can be employed in other petroleum products, the metals may be present in other forms and other compounds, within the broad scope of our invention, may be substituted for the compounds specifically referred to hereinbefore. While we have disclosed the use of single metal deactivators, it will be apparent that mixtures of two or more metal deactivators may be employed if desired.

Besides many others, the following compounds are within the scope of our invention:

Guanylguanidine
a-Phenyl-a-methyl-guanylguanidine
a-(o-Tolyl)-guanylguanidine
a-(p-Tolyl)-guanylguanidine
a-(2-naphthyl)-guanylguanidine
a-(4-hydroxyphenyl)-guanylguanidine
a-(4-aminophenyl)-guanylguanidine
a-(2-methoxyphenyl)-guanylguanidine
a-(4-ethoxyphenyl)-guanylguanidine
a-Xylyl-guanylguanidine
a-(o-Cymyl)-guanylguanidine
a-(o-Biphenyl)-guanylguanidine
a-(p-Biphenyl)-guanylguanidine
a-(2-pyridyl)-guanylguanidine
a-Butyl-guanylguanidine
a-Decyl-guanylguanidine The deactivators may be added to the petroleum hydrocarbons to be protected in any form and manner. They may be in solid or liquid form, mixed with other addition agents or dissolved in a solvent. They may be dissolved in the hydrocarbons or dispersed therein in any suitable manner. They may be added to the finished petroleum hydrocarbon product or to the product at any stage in its manufacture.

It will be apparent that, by our invention, we are able to effect the stabilization of petroleum hydrocarbons susceptible to the harmful action of molecular oxygen catalyzed by vanadium, manganese, iron, cobalt, copper and their catalytically active compounds. This stabilization may be accomplished, in accordance with our invention, by the addition of metal deactivators, preferably, in combination with an amount of an antioxidant sufficient to stabilize the hydrocarbons in the absence of metal catalysts. It is often technically and economically unfeasible to counteract the catalytic effects of such metals by means of an antioxidant alone. We believe that the metal deactivators of our invention function by forming very stable complexes with the metals, which complexes are catalytically inactive. It appears that the metal deactivators of our invention, in general, are not antioxidants. However, our invention is not to be limited by any theory as to the manner in which the metal deactivators function to produce the results.

We claim:

1. A composition comprising petroleum hydrocarbons, normally subject to deterioration caused by the action of molecular oxygen, containing a catalyst of the group consisting of vanadium, manganese, iron, cobalt, copper and their compounds, normally effective to catalyze oxidation of said petroleum hydrocarbons, and having incorporated therein a metal deactivator in a small proportion sufficient to deactivate said catalyst, said metal deactivator being a guanylguanidine compound of the group consisting of guanylguanidines, having the formula

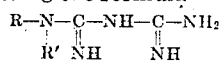

wherein R represents a member of the group consisting of hydrogen and a cyclic organic radical and R' represents a member of the group consisting of hydrogen and an alkyl radical, and salts of such guanylguanidines.

2. A composition comprising petroleum hydrocarbons, normally subject to deterioration caused by the action of molecular oxygen, containing a catalyst of the group consisting of vanadium, manganese, iron, cobalt, copper and their compounds, normally effective to catalyze oxidation of said petroleum hydrocarbons, and having incorporated therein a metal deactivator in a small proportion sufficient to deactivate said catalyst, said metal deactivator being a guanylguanidine, having the formula

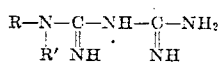

wherein R represents a member of the group consisting of hydrogen and a cyclic organic radical and R' represents a member of the group consisting of hydrogen and an alkyl radical.

3. A composition comprising petroleum hydrocarbons, normally subject to deterioration caused by the action of molecular oxygen, containing a catalyst of the group consisting of vanadium, manganese, iron, cobalt, copper and their compounds, normally effective to catalyze oxidation of said petroleum hydrocarbons, and having incorporated therein a metal deactivator in a small proportion sufficient to deactivate said catalyst, said metal deactivator being an a-substituted guanylguanidine wherein one and only one substituent is a cyclic radical.

4. A composition comprising petroleum hydrocarbons, normally subject to deterioration caused by the action of molecular oxygen, containing a catalyst of the group consisting of vanadium, manganese, iron, cobalt, copper and their compounds, normally effective to catalyze oxidation of said petroleum hydrocarbons, and having incorporated therein a metal deactivator in a small proportion sufficient to deactivate said catalyst, said metal deactivator being an a-substituted guanylguanidine wherein one and only one substituent is a cyclic radical, and which metal deactivator is devoid of strongly acidic groups.

5. A composition comprising petroleum hydrocarbons, normally subject to deterioration caused by the action of molecular oxygen, containing a catalyst of the group consisting of vanadium, manganese, iron, cobalt, copper and their compounds, normally effective to catalyze oxidation of said petroleum hydrocarbons, and having incorported therein a metal deactivator in a small proportion sufficient to deactivate said catalyst, said metal deactivator being an a-monosubstituted guanylguanidine wherein the substituent is a cyclic radical devoid of strongly acidic groups.

6. A composition comprising petroleum hydrocarbons, normally subject to deterioration caused by the action of molecular oxygen, containing a catalyst of the group consisting of vanadium, manganese, iron, cobalt, copper and their compounds, normally effective to catalyze oxidation of said petroleum hydrocarbons, and having incorporated therein a metal deactivator in a small proportion sufficient to deactivate said catalyst, said metal deactivator being an a-monosubstituted guanylguanidine wherein the substituent is a cyclic radical consisting of carbon and hydrogen.

7. A composition comprising petroleum hydrocarbons, normally subject to deterioration caused by the action of molecular oxygen, containing a catalyst of the group consisting of vanadium, manganese, iron, cobalt, copper and their compounds, normally effective to catalyze oxidation of said petroleum hydrocarbons, and having incorporated therein a metal deactivator in a small proportion sufficient to deactivate said catalyst, said metal deactivator being an a-monosubstituted guanylguanidine wherein the substituent is an aromatic radical devoid of strongly acidic groups.

8. A composition comprising petroleum hydrocarbons, normally subject to deterioration caused by the action of molecular oxygen, containing a catalyst of the group consisting of vanadium, manganese, iron, cobalt, copper and their compounds, normally effective to catalyze oxidation of said petroleum hydrocarbons, and having incorporated therein a metal deactivator in a small proportion sufficient to deactivate said catalyst, said metal deactivator being an a-monosubstituted guanylguanidine in which the substituent is an aromatic radical of the benzene series devoid of strongly acidic groups.

9. A composition comprising petroleum hydrocarbons, normally subject to deterioration caused by the action of molecular oxygen, containing a catalyst of the group consisting of vanadium, manganese, iron, cobalt, copper and their compounds, normally effective to catalyze oxidation of said petroleum hydrocarbons, and having incorporated therein a metal deactivator in a small proportion sufficient to deactivate said catalyst, said metal deactivator being an a-monosubstituted guanyl-guanidine in which the substituent is an aryl radical of the benzene series.

10. A composition comprising petroleum hydrocarbons, normally subject to deterioration caused by the action of molecular oxygen, containing a catalyst of the group consisting of vanadium, manganese, iron, cobalt, copper and their compounds, normally effective to catalyze oxidation of said petroleum hydrocarbons, and having incorporated therein a metal deactivator in a small proportion sufficient to deactivate said catalyst, said metal deactivator being a-phenylguanylguanidine.

11. A composition comprising petroleum hydrocarbons, normally subject to deterioration caused by the action of molecular oxygen, containing a catalyst of the group consisting of vanadium, manganese, iron, cobalt, copper and their compounds, normally effective to catalyze oxidation of said petroleum hydrocarbons, and a small proportion of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being a guanylguanidine compound of the group consisting of guanylguanidines, having the formula

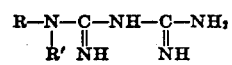

wherein R represents a member of the group consisting of hydrogen and a cyclic organic radical and R' represents a member of the group consisting of hydrogen and an alkyl radical, and salts of such guanylguanidines.

12. A composition comprising petroleum hydrocarbons, normally subject to deterioration caused by the action of molecular oxygen, containing a catalyst of the group consisting of vanadium, manganese, iron, cobalt, copper and their compounds, normally effective to catalyze oxidation of said petroleum hydrocarbons, and a small proportion of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being an a-monosubstituted guanylguanidine wherein the substituent is a cyclic radical devoid of strongly acidic groups.

13. A composition comprising a non-viscous hydrocarbon oil, normally subject to deterioration caused by the action of molecular oxygen, containing a catalyst of the group consisting of vanadium, manganese, iron, cobalt, copper and their compounds, normally effective to catalyze oxidation of said oil, and having incorporated therein a metal deactivator in a small proportion sufficient to deactivate said catalyst, said metal deactivator being a guanylguanidine compound of the group consisting of guanylguanidines, having the formula

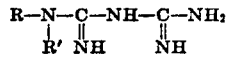

wherein R represents a member of the group consisting of hydrogen and a cyclic organic radical and R' represents a member of the group consisting of hydrogen and an alkyl radical, and salts of such guanylguanidines.

14. A composition comprising a non-viscous hydrocarbon oil, normally subject to deterioration caused by the action of molecular oxygen, containing a catalyst of the group consisting of vanadium, manganese, iron, cobalt, copper and their compounds, normally effective to catalyze oxidation of said oil, and having incorporated therein a metal deactivator in a small proportion sufficient to deactivate said catalyst, said metal deactivator being an a-monosubstituted guanylguanidine wherein the substituent is a cyclic radical devoid of strongly acidic groups.

15. A composition comprising a non-viscous hydrocarbon o.l, normally subject to deteriora.ion caused by the action of molecular oxygen, containing a catalyst of the group consisting of vanadium, manganese, iron, cobalt, copper and their compounds, normally effective to catalyze oxidation of said oil, and having incorporated therein a metal deactivator in a small proportion suffic ent to deactivate said catalyst, said metal deactivator being an a-monosubstituted guanylguanidine in which the substituent is an aromatic radical of the benzene series devoid of strongly ac dic groups.

16. A composition comprising a non-viscous hydrocarbon oil, normally subject to deterioration caused by the action of molecular oxygen, containing a catalyst of the group consisting of vanadium, manganese, iron, cobalt, copper and their compounds, normally effective to catalyze oxidation of said oil, and having incorporated therein a metal deactivator in a small proportion sufficient to deactivate said catalyst, said metal deactivator being a-phenyl-guanyl-guanidine.

17. A composition comprising a non-viscous hydrocarbon oil, normally subject to deterioration caused by the action of molecular oxygen, containing a catalyst of the group consisting of vanadium, manganese, iron, cobalt, copper and their compounds, normally effective to catalyze oxidation of said oil, and a small proportion of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being a guanylguanidine compound of the group consisting of guanylguanidines, having the formula

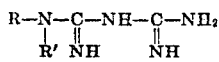

wherein R represents a member of the group consisting of hydrogen and a cyclic organic radical and R' represents a member of the group consisting of hydrogen and an alkyl radical, and salts of such guanylguanidines.

18. A composition comprising a non-viscous hydrocarbon oil, normally subject to deterioration caused by the action of molecular oxygen, containing a catalyst of the group consisting of vanadium, manganese, iron, cobalt, copper and their compounds, normally effective to catalyze oxidation of sa d oil, and a small proportion of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being an a-monosubstituted guanylguanidine wherein the substituent is a cyclic radical devoid of strongly acidic groups.

19. A composition comprising a non-viscous hydrocarbon oil, normally subject to deterioration caused by the action of molecular oxygen, containing a catalyst of the group consisting of vanadium, manganese, iron, cobalt, copper and their compounds, normally effective to catalyze oxidation of said oil, and a small proportion of an antioxidant, normally effective to materially retard such deterioration in the absence of said catalyst but which is less effective in the presence of said catalyst, and hav'ng incorporated therein a metal deactivator in a small proportion sufficient to deactivate said catalyst, said metal deactivator being an a-monosubstituted guanylguanidine in which the substituent is an aromatic radical of the benzene series devoid of strongly acidic groups.

20. A composition comprising a non-viscous hydrocarbon oil, normally subject to deterioration caused by the action of molecular oxygen, containing a catalyst of the group consisting of vanadium, manganese, iron, cobalt, copper and their compounds, normally effective to catalyze oxidation of said oil, and a small proportion of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being a-phenyl-guanylguanidine.

FREDERICK B. DOWNING.
CHARLES J. PEDERSEN.